Patented Feb. 8, 1927.

1,617,201

UNITED STATES PATENT OFFICE.

HENRY N. DONS, OF ROCHESTER, NEW YORK, ASSIGNOR TO NELSON A. HALLAUER, TRUSTEE, OF ROCHESTER, NEW YORK.

PROCESS FOR RECOVERING THE OIL FROM MINERAL OIL EMULSIONS.

No Drawing. Application filed June 20, 1922. Serial No. 569,749.

The object of my invention is to provide a process for recovering the oil from mineral oil emulsions which will recover a larger percentage of the oils from the emulsion than heretofore possible.

Another object of my invention is to provide a process of this kind which is economical, and which separates the oil from water and other foreign substances more quickly than processes heretofore known.

More specifically the object of my invention is to provide a process for treating emulsions of mineral oils with an alkali compounded with vegetable matter, such as cellulose, which quickly breaks up the emulsion and separates the oil from the foreign matter.

My process is especially adapted for recovering the mineral oil contained in what is known as B. S. or bottom settlings, roily oils, and the oils from wells yielding oils containing such a high percentage of water, salt or other foreign substance, as to render them practically worthless, such oils are refused by the pipe line companies and in some fields their disposal has become a very difficult problem.

According to my process the oils, B. S., or emulsions are treated with granulated or pulverized raw vegetable matter, preferably vegetable matter combined with alkali such as sodium, potassium or ammonium hydroxide. Such compounds serve to quickly overcome the surface stress, and the small globules of oil contained in the B. S. or roily oil separate from the water, salt or other foreign matter with which it is emulsified.

In practice, I have found that cellulose impregnated with a soluble metallic base or ammonium hydroxide is to be preferred for treating emulsions of mineral oils such as B. S., roily oil, or the imperfect emulsions yielded by some oil wells. In treating these, the emulsions are mixed or intermingled with cellulose material prepared by treating cellulose with a concentrated solution in water of caustic soda, caustic potash, ammonium hydroxide, or any soluble basic oxide or hydroxide, either with the aid of stirring apparatus such as an agitator, or by passing compressed air, or natural gas through the mass until the separation of the oil and foreign matter has taken place. With some emulsions, I have found that the process is materially hastened by the application of gentle heat. The mass is then left to settle and in a short time, the oil will be found in a strata over a strata of water and other foreign matter and at the bottom a strata of the material employed. The time required for the operation varies with the nature or source of the emulsions being treated, some being more refractory than others. After complete separation has taken place, the strata of water and other foreign matter may be drawn off, in any suitable manner as through an opening in the side of the containing vessel or by means of a suction pump, and replaced with a new charge of the B. S., or other oily emulsion to be treated and the operation repeated with the same charge of alkaline cellulose. The oil separated from the bottom settlings, roily oil, or other emulsion as above described, may be afterwards filtered through a filter press of usual and well known construction. Many emulsions, roily oils or base settlings may be completely separated from water and other foreign matter by the use of the filter press alone and by previously mixing them with the material without waiting for the settling operation.

While many vegetable substances which are not oily or fatty in any form may be impregnated with a basic oxide or hydroxide to separate the oil from its emulsion, I have found that raw cellulose in a granulated form impregnated with sodium hydroxide, provides the cheapest and most efficient process. A very small quantity of the material compared with the volume of oil to be treated is required. Experiments indicate that the quantity of material required to treat a given volume of emulsion varies with the nature or source of the B. S. or emulsion to be treated. In practice I have found that from 1% to 5% by volume of the material is sufficient to break up the emulsions commonly met with in the field.

Having described my invention what I claim and desire to secure by Letters Patent is:

1. The process of separating mineral oils from their emulsions with water and other foreign substances, which consists in mixing therewith a quantity of cellulose impregnated with a caustic alkali whereby the oil is permitted to separate from the water and other foreign matter.

2. The process of separating mineral oils from their emulsions with water and other foreign substances, which consists in mixing therewith a quantity of cellulose impregnated with sodium hydroxide whereby the oil is separated from the water and other foreign matter.

HENRY N. DONS